(12) United States Patent
Shingler

(10) Patent No.: US 12,108,303 B2
(45) Date of Patent: *Oct. 1, 2024

(54) SOCIAL MEDIA SYSTEMS AND METHODS AND MOBILE DEVICES THEREFOR

(71) Applicant: Flying Eye Reality, Inc., St. John, IN (US)

(72) Inventor: Raymond Charles Shingler, Valparaiso, IN (US)

(73) Assignee: Flying Eye Reality, Inc, St. John, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/966,846

(22) Filed: Oct. 16, 2022

(65) Prior Publication Data

US 2023/0033210 A1    Feb. 2, 2023

Related U.S. Application Data

(63) Continuation of application No. 17/166,679, filed on Feb. 3, 2021, and a continuation of application No.
(Continued)

(51) Int. Cl.
*H04W 4/00* (2018.01)
*G06F 3/04817* (2022.01)
(Continued)

(52) U.S. Cl.
CPC ........ *H04W 4/023* (2013.01); *G06F 3/04817* (2013.01); *G06F 3/0482* (2013.01);
(Continued)

(58) Field of Classification Search
CPC ..... H04W 4/023; H04W 4/08; G06F 3/04817; G06Q 50/01
See application file for complete search history.

(56) References Cited

U.S. PATENT DOCUMENTS 9,351,118 B2   5/2016  Crutchfield
9,645,221 B1   5/2017  Heizer
(Continued)

FOREIGN PATENT DOCUMENTS

WO    PCT/US24/11441    4/2024

OTHER PUBLICATIONS

U.S. Appl. No. 17/166,679, filed May 1, 2024, Response to Office Action.
(Continued)

*Primary Examiner* — Omoniyi Obayanju
(74) *Attorney, Agent, or Firm* — Birch Tree IP Law & Strategy PLLC; Jamie T. Gallagher

(57) ABSTRACT

Methods and systems, including processor-readable storage media, for interacting in a social media environment via a mobile device involving profile information that includes a multicolor profile displayable graphic based on profile questions having answers with different shades of question color associated with an answer. The social media environment may include an augmented reality user interface for displaying real world images obtained via a camera of the mobile device along with a virtual object representing items including, but not limited to, a marketing opportunity, another user of the system, profile information of another user of the system, a content item corresponding to another user of the system.

46 Claims, 6 Drawing Sheets
(6 of 6 Drawing Sheet(s) Filed in Color)

Related U.S. Application Data

17/186,265, filed on Feb. 26, 2021, now Pat. No. 11,533,585, and a continuation of application No. 17/197,808, filed on Mar. 10, 2021, now Pat. No. 11,528,580, which is a continuation of application No. 17/186,265, filed on Feb. 26, 2021, now Pat. No. 11,533,585, which is a continuation of application No. 17/166,679, filed on Feb. 3, 2021, which is a continuation of application No. 16/989,713, filed on Aug. 10, 2020, now Pat. No. 10,945,094, which is a continuation of application No. 15/696,803, filed on Sep. 6, 2017, now Pat. No. 10,743,131.

(60) Provisional application No. 62/383,813, filed on Sep. 6, 2016.

(51) Int. Cl.
*G06F 3/0482* (2013.01)
*G06Q 50/00* (2012.01)
*H04N 23/62* (2023.01)
*H04N 23/63* (2023.01)
*H04W 4/02* (2018.01)
*H04W 4/08* (2009.01)
*G06F 3/14* (2006.01)

(52) U.S. Cl.
CPC ............ *G06Q 50/01* (2013.01); *H04N 23/62* (2023.01); *H04N 23/63* (2023.01); *H04W 4/08* (2013.01); *G06F 3/14* (2013.01)

(56) References Cited

U.S. PATENT DOCUMENTS

| | | | |
|---|---|---|---|
| 9,743,244 B2 | 8/2017 | Crutchfield | |
| 10,108,859 B1 | 10/2018 | Suiter et al. | |
| 10,257,649 B2 | 4/2019 | Crutchfield et al. | |
| 10,334,134 B1 | 6/2019 | Suiter et al. | |
| 2007/0125861 A1* | 6/2007 | Shoobridge | G06K 19/06056 |
| | | | 235/494 |
| 2008/0051033 A1 | 2/2008 | Hymes | |
| 2008/0268876 A1 | 10/2008 | Gelfand et al. | |
| 2014/0236468 A1 | 8/2014 | Dave et al. | |
| 2015/0296340 A1 | 10/2015 | Crutchfield | |
| 2016/0203352 A1* | 7/2016 | Marsico | G06K 7/1417 |
| | | | 235/375 |
| 2016/0234643 A1 | 8/2016 | Crutchfield | |
| 2017/0359690 A1 | 12/2017 | Crutchfield et al. | |
| 2018/0069817 A1 | 3/2018 | Constantinides | |
| 2019/0246238 A1 | 8/2019 | Crutchfield et al. | |

OTHER PUBLICATIONS

U.S. Appl. No. 17/166,679, filed May 20, 2024, Office Action (Final).
U.S. Appl. No. 17/966,845, filed May 1, 2024, Response to Office Action.
U.S. Appl. No. 17/966,845, filed May 20, 2024, Notice of Allowance.
U.S. Appl. No. 17/966,846, filed May 1, 2024, Response to Office Action.
U.S. Appl. No. 17/966,846, filed May 15, 2024, Notice of Allowance.
U.S. Appl. No. 18/356,686, filed Jun. 4, 2024, Office Action.
U.S. Appl. No. 18/356,686, filed Jun. 6, 2024, Response to Office Action.
U.S. Appl. No. 18/356,686, filed Jun. 26, 2024, Notice of Allowance.
U.S. Appl. No. 18/356,748, filed Jul. 2, 2024, Notice of Allowance.
U.S. Appl. No. 18/356,763, filed Jul. 1, 2024, Notice of Allowance.

* cited by examiner

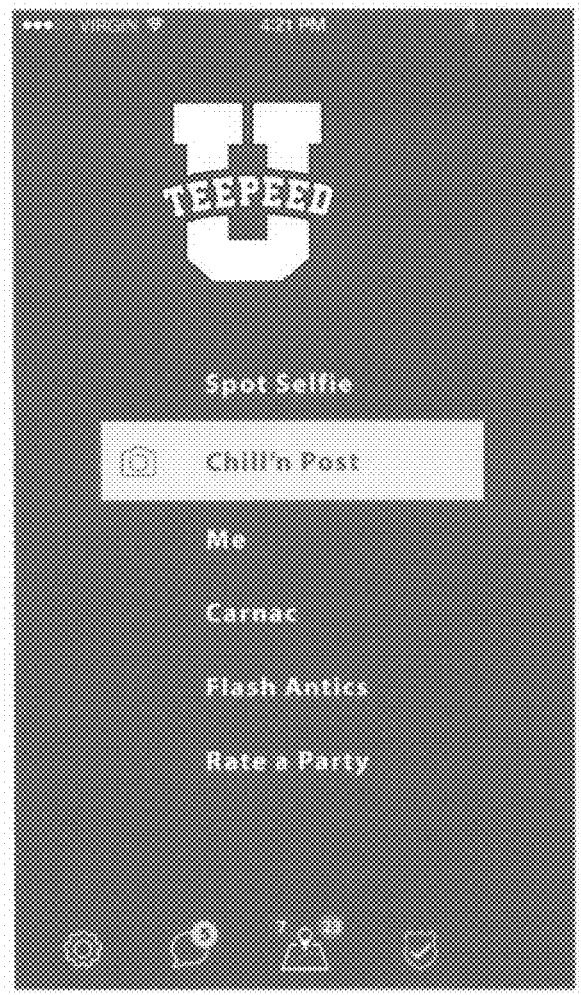
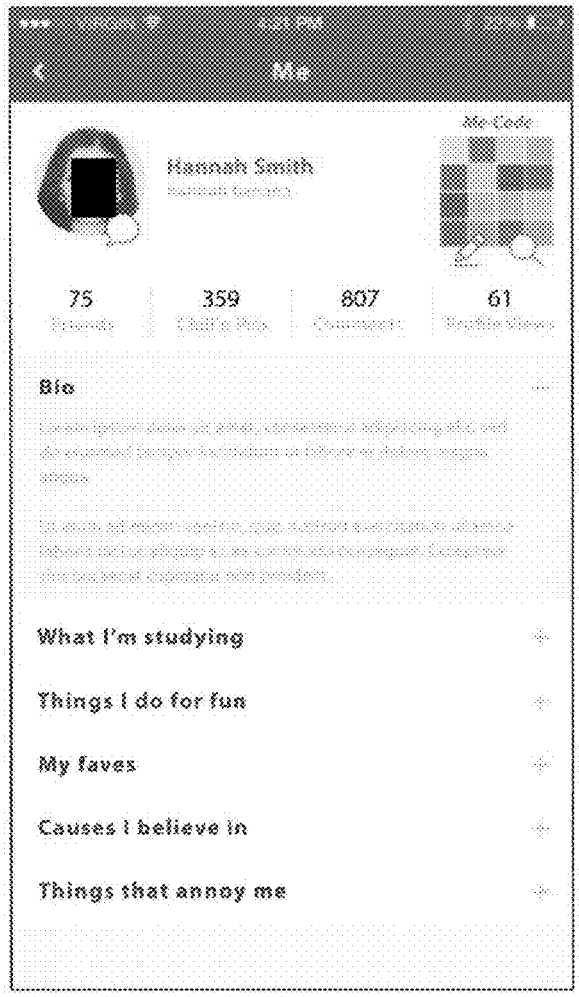
FIG. 1
FIG. 2

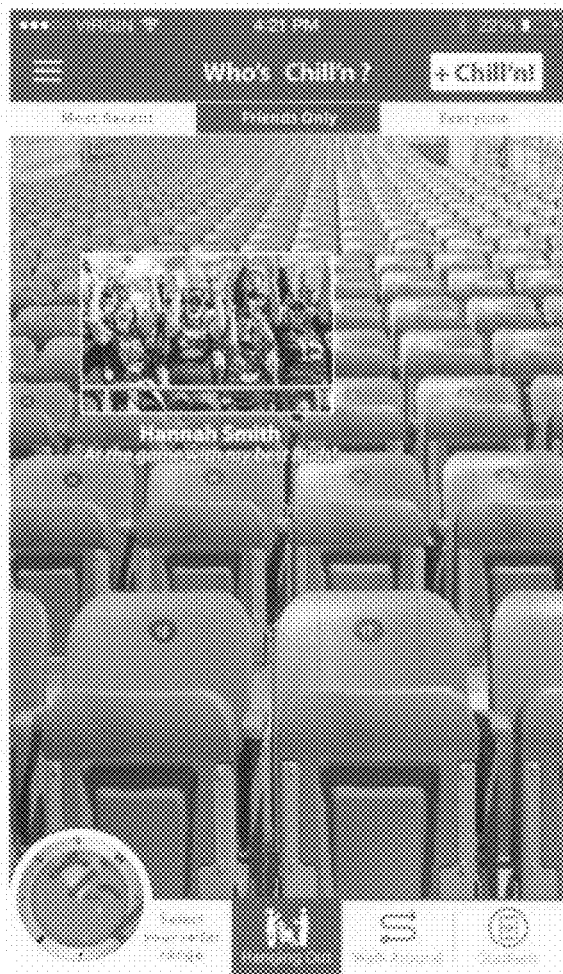
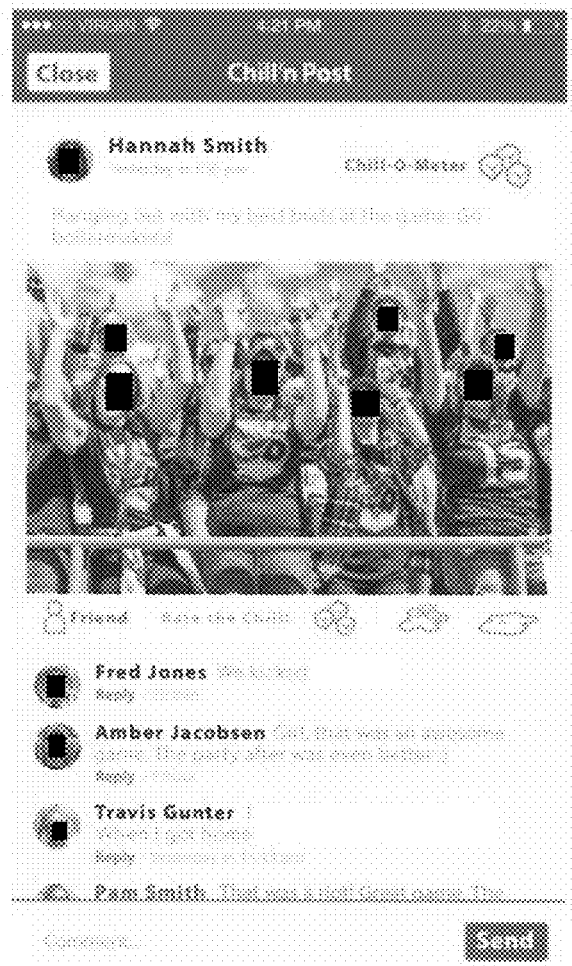
FIG. 5
FIG. 6

FIG. 8

1. Initial screen at start

FIG. 9

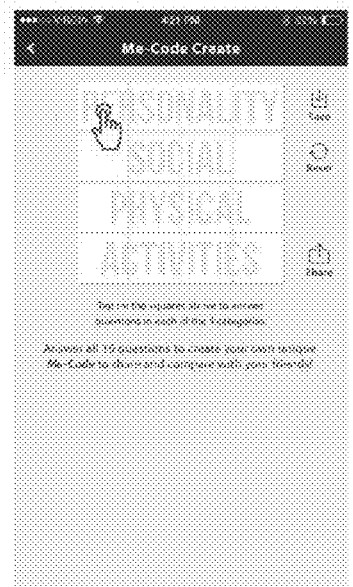

2. Tap any one of the 16 squares in the grid to pop-up the question that is associated with that particular square.

In the graphic above, the person is tapping on the 1st square in the personality row (see green hand).

FIG. 10

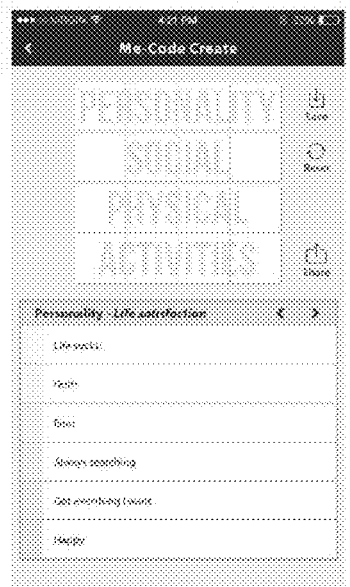

3. After the tap, a question for that square will pop-up along with 6 answers that each have their own shade of color assigned to them. The 6 shades of color are from a gradient of a particular color. In the example above it is yellow.

FIG. 11

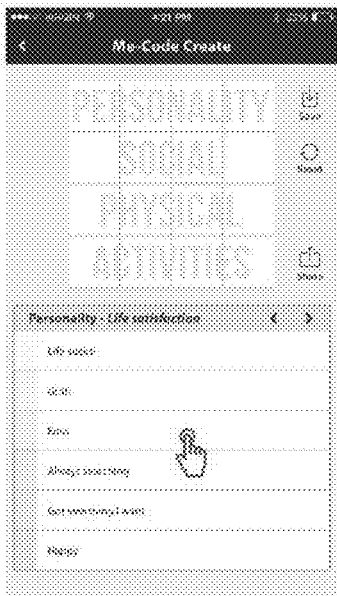

4. The user now selects an answer that best describes their current state of *Life Satisfaction* by tapping on the answer (see green hand).

7. This is done for each of the remaining 15 squares in the grid. Users can go in any order by tapping any square they want. They can also cycle through the questions by tapping either the less than or greater than characters that are located to the right of the category and question line (see green arrow).

They can change their answers by simply tapping on the square again to pop-up that question to select another answer, changing the color chip shade.

FIG. 12

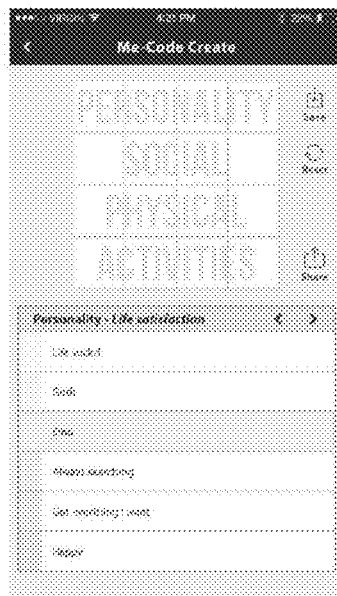

5. After the system receives the tap it changes the whole line from white to the color associated with color chip that was visible on the far left side of the answer.

8. Once all 16 questions are answered a user can *Share* their code with other friends in the *TeepeedU* platform (see graphic on the right).

They can also create a Me-Code of a person they are interested in searching for.

The system will return a list of people that match based on the highest percentage amount matched first.

Users can *Reset* their code to default white and start over again.

FIG. 13

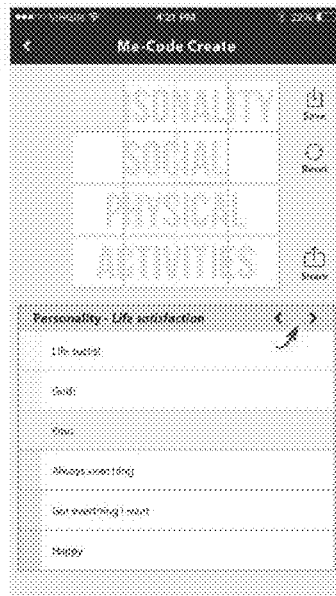

6. Almost instantly after the answer is selected, the associated square above also turns to the same color chip of the answer selected below.

FIG. 14

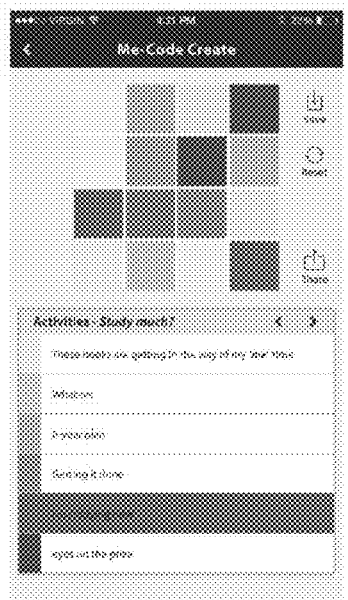

SOCIAL MEDIA SYSTEMS AND METHODS AND MOBILE DEVICES THEREFOR

RELATED APPLICATION DATA

This application is a continuation application of U.S. patent application Ser. No. 17/197,808, filed Mar. 10, 2021, entitled "Social Media Systems and Methods and Mobile Devices Therefor;" U.S. patent application Ser. No. 17/186, 265, filed Feb. 26, 2021, entitled "Social Media Systems and Methods and Mobile Devices Therefor;" and U.S. patent application Ser. No. 17/166,679, filed Feb. 3, 2021, entitled "Social Media Systems and Methods and Mobile Devices Therefor," each of which is incorporated by reference herein in its entirety. U.S. patent application Ser. No. 17/186,265, filed Feb. 26, 2021, entitled "Social Media Systems and Methods and Mobile Devices Therefor," is a continuation application of U.S. patent application Ser. No. 17/166,679, filed Feb. 3, 2021, entitled "Social Media Systems and Methods and Mobile Devices Therefor," which is a continuation application of U.S. patent application Ser. No. 16/989, 713, filed Oct. 10, 2020, entitled "Social Media Systems and Methods and Mobile Devices Therefor," which is a continuation application of U.S. patent application Ser. No. 15/696, 803, filed Sep. 6, 2017, entitled "Social Media Systems and Methods and Mobile Devices Therefor," each of which is incorporated by reference herein in its entirety. This application also claims the benefit of priority of U.S. Provisional Patent Application Ser. No. 62/383,813, filed Sep. 6, 2016, entitled "Social Media Systems and Method," which application is incorporated by reference herein in its entirety.

This application is also related to U.S. patent application Ser. No. 16/989,348, filed on Aug. 10, 2020, entitled "Social Media Systems and Methods and Mobile Devices Therefor."

BACKGROUND

The present invention generally relates to social media platforms, systems, and methods. The invention particularly relates to a system for, a method of, and processor-readable physical storage medium including instructions for a method of interacting in a social media environment.

Various social media tools, such as websites and mobile apps, are available that provide users with the capability of exchanging information, particularly user generated content such as text, digital photo, or digital video posts. An example is disclosed in U.S. Pat. No. 9,743,244 to Crutchfield. Commonly, such tools allow users to create their own profiles, which is included in an online social network that connects the user's profile with those of other individuals and/or groups. Such tools generally promote interactions between the users within the network, such as commenting on other user's content, joining virtual groups, and the like. While these capabilities are beneficial for users to remain in contact with other users that they are already acquainted with, the tools may be limited in their ability to connect and exchange information between users that are strangers or otherwise not yet socially acquainted. A such, it would be desirable if a system were available for selectively providing a user with social media-related information about other users with whom they are unacquainted to promote direct person-to-person communications and social interactions.

SUMMARY OF THE DISCLOSURE

In one implementation, a method for the interaction of a user of a social media environment via a mobile device is provided. The method includes presenting a plurality of profile questions to each of a plurality of the users of a social media environment via a corresponding mobile device, each of the plurality of profile questions having a set of profile question answers; receiving from each of the plurality of the users via a corresponding mobile device a selection of an answer from the corresponding set of question profile answers for each of one or more of the plurality of profile questions; each of the plurality of profile questions having associated therewith a question color, each of the profile question answers for the corresponding profile question having associated therewith a different shade of the corresponding question color; for each of the plurality of users, creating in the social media environment a multicolor profile displayable graphic based on the corresponding user's profile question answers, the multicolor profile displayable graphic including a plurality of answer display regions, each of the plurality of answer display regions corresponding to a question of the plurality of profile questions, wherein the shade of question color that corresponds to the selected profile question answer by the corresponding user is included in the answer display region of the plurality of answer display regions that corresponds to the question of the plurality of profile questions that corresponds to the selected profile question answer, wherein the multicolor profile displayable graphic and the profile question answers for each of the plurality of users are part of the social media profile of the corresponding user; and displaying a first multicolor profile displayable graphic corresponding to a first user of the plurality of users to the first user via a first mobile device of the first user.

In another implementation, a method for the interaction of a user of a social media environment via a mobile device is provided. The method includes presenting a plurality of profile questions to each of a plurality of the users of a social media environment via a corresponding mobile device, each of the plurality of profile questions having a set of profile question answers; receiving from each of the plurality of the users via a corresponding mobile device a selection of an answer from the corresponding set of question profile answers for each of one or more of the plurality of profile questions; each of the plurality of profile questions having associated therewith a question color, each of the profile question answers for the corresponding profile question having associated therewith a different shade of the corresponding question color; for each of the plurality of users, creating in the social media environment a multicolor profile displayable graphic based on the corresponding user's profile question answers, the multicolor profile displayable graphic including a plurality of answer display regions, each of the plurality of answer display regions corresponding to a question of the plurality of profile questions, wherein the shade of question color that corresponds to the selected profile question answer by the corresponding user is included in the answer display region of the plurality of answer display regions that corresponds to the question of the plurality of profile questions that corresponds to the selected profile question answer, wherein the multicolor profile displayable graphic and the profile question answers for each of the plurality of users are part of the social media profile of the corresponding user; displaying a first multicolor profile displayable graphic corresponding to a first user of the plurality of users to the first user via a first mobile device of the first user, wherein the first multicolor profile displayable graphic is a grid shaped graphic and each of the answer display regions is a region within a grid pattern; matching the first user to a second user of the plurality of users based on a percentage match of (a) the first multicolor profile displayable graphic of the first user to a second multicolor profile displayable graphic of the second user or (b) the selected profile question answers of the first user to the selected profile question answers of the second user; allowing the first user to access the second multicolor profile displayable graphic based on said matching; and allowing the first user to access a non-personal profile item of content of the second user based on said matching.

In yet another implementation, a processor-readable nonvolatile memory including processor-executable instructions for performing a method of interacting in a social media environment is provided. The instructions include a set of instructions for presenting a plurality of profile questions to each of a plurality of the users of a social media environment via a corresponding mobile device, each of the plurality of profile questions having a set of profile question answers; a set of instructions for receiving from each of the plurality of the users via a corresponding mobile device a selection of an answer from the corresponding set of question profile answers for each of one or more of the plurality of profile questions; each of the plurality of profile questions having associated therewith a question color, each of the profile question answers for the corresponding profile question having associated therewith a different shade of the corresponding question color; a set of instructions for, creating in the social media environment, for each of the plurality of users, a multicolor profile displayable graphic based on the corresponding user's profile question answers, the multicolor profile displayable graphic including a plurality of answer display regions, each of the plurality of answer display regions corresponding to a question of the plurality of profile questions, wherein the shade of question color that corresponds to the selected profile question answer by the corresponding user is included in the answer display region of the plurality of answer display regions that corresponds to the question of the plurality of profile questions that corresponds to the selected profile question answer, wherein the multicolor profile displayable graphic and the profile question answers for each of the plurality of users are part of the social media profile of the corresponding user; and a set of instructions for displaying a first multicolor profile displayable graphic corresponding to a first user of the plurality of users to the first user via a first mobile device of the first user.

According to one aspect of the invention, a social media system and method are provided that include the use of mobile devices to provide the capability for a plurality of individuals to communicate through a location-based augmented reality feature of an app that is stored and operating on the mobile devices.

Another aspect of the invention is a mobile device on which the app and its location-based augmented reality feature are stored and operating as described above.

Still another aspect of the invention includes providing for a first user of a social media system to pin user content to a specific geographic location using a location-based augmented reality feature of an app that is stored and operating on a mobile device of the first user, and allowing a second user of the social media system to access the user content through the location-based augmented reality feature of the app that is also stored and operating on a mobile device of the second user.

Yet another aspect of the invention includes identifying a first user of a social media system with a location-based augmented reality feature of an app that is stored and operating on a mobile device of a second user of the social media system, and then with the app providing the second user access to user content created by the first user.

Technical effects of the methods and systems described above preferably include the capability of a first individual to quickly access limited user content about another individual who is physically or virtually located within the physical vicinity of the first individual's present geographic location, thereby promoting direct person-to-person communications and social interactions between individuals.

Other aspects and advantages of this invention will be further appreciated from the following detailed description.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 1 represents a main menu displayed on a display of a handheld electronic mobile device (cellular phone) by a computer application software (app) operating on the mobile device, wherein various features of the app are displayed on the mobile device in accordance with a nonlimiting embodiment of the invention.

FIG. 2 represents user content created by a user of the app and displayed on the mobile device of FIG. 1 in accordance with a nonlimiting embodiment of the invention.

FIG. 5 represents the display of the mobile device of FIG. 1 showing an image provided by a user of the app and relating to a past social gathering, pinned to a geographic location by the user, and viewable by other users of the app via a location-based augmented reality feature that overlays the pinned image onto an image of the geographical location captured by a camera of the mobile device in accordance with a nonlimiting embodiment of the invention.

FIG. 6 represents the display of the mobile device of FIG. 1 showing user content provided by a user of the app that becomes accessible by other users of the app upon viewing the image of FIG. 5 with the location-based augmented reality feature. Viewers can comment and/or rate the image.

FIGS. 8 through 14 represent the display of the mobile device of FIG. 1 showing steps that may be taken by a user to create "My C-Code" user content in accordance with a nonlimiting embodiment of the invention

DETAILED DESCRIPTION

Figure 3:
FIG. 3 represents the display of the mobile device of FIG. 1 showing an image "pinned" to a geographic location by a user of the app and viewable by other users of the app via a location-based augmented reality feature of the app that overlays the pinned image onto an image of the geographical location captured by a camera of the mobile device in accordance with a nonlimiting embodiment of the invention.

FIGS. 1 through 14 represent images displayed on a display of a handheld electronic mobile device (in the example, a cellular phone) by a computer application software ("app") operating on the mobile device. As used herein, the term "mobile device" refers to any handheld electronic device capable of wirelessly communicating across a mobile network. For this purpose, such a mobile device will typically comprise volatile and nonvolatile (non transitory) memory (processor readable media), a processor for executing processor executable instructions stored on the nonvolatile memory, an input device, a display, a camera, a location device, and a transceiver, and have the ability to generate an output, transmit the output to the mobile network via the transceiver, and receive signals from the mobile network via the transceiver. Current examples of mobile devices include, but are not limited to, cellular telephones, smart phones, tablets, personal digital assistants (PDAs), portable computers, etc. Processors, memory, transceivers, input devices, displays, cameras, and location devices capable of use in mobiles devices encompass a wide variety of electronic devices known in the art as well as those yet to be developed. Memory used in mobile devices of interest serve to store apps, operating systems, software, and/or logic, including the app operating on the mobile device represented in FIGS. 1 through 14. In this regard, processor executable instructions of the app are stored in the nonvolatile memory of the mobile device so that, when executed by a processor, the mobile device performs operations described below in reference to FIGS. 1 through 14. Input devices used in mobile devices of interest typically comprise a physical or screen-generated keyboard. Location devices commonly found in mobile devices of interest are typically GPS (Global Positioning System) receivers, though other geolocation technologies are foreseeable. Transceivers used in mobile devices of interest include but are not limited to cellular, GPRS, Bluetooth, and Wi Fi transceivers.

The mobile device represented in FIGS. 1 through 14 utilizes its transceiver to communicate with a mobile network, which in combination with the app operating on the mobile device provide or otherwise perform as a social media tool (hereinafter, "tool") configured to promote the communication and exchange of information between multiple users of the app based on their actual physical locations ("user locations") as established by the geographic locations of the mobile devices of the users, or their virtual locations ("pinned locations," as described herein below), both of which can be detected by cameras and location devices associated with their mobile devices. Although the tool is described here in reference to certain images displayed by the app operating on a cellular phone as shown in the drawings, it should be understood that the tool and its app may display additional or other images and thereby have additional or other visual appearances. Furthermore, the tool may utilize additional devices and their features, such as but not limited to servers, databases, wireless communication devices, GPS location device, etc., within the mobile network.

According to a particular aspect of the invention, the tool allows each of its user to generate user-generated content ("user content") that includes, but is not limited to, a personal profile containing limited personal information about themselves. Such user content may then be selectively accessible (based on privacy settings set by the user) by other users of the tool via a location-based augmented reality feature of the app, but only when the other users are within the physical vicinity (geographic area) of the user location of the user that created the user content, and/or within the physical vicinity (geographic area) of a pinned location that the user that created the user content has associated with their user content. As used herein, a pinned location means a geographic location that has been selected by the user and to which an image has been "pinned" by the user as a virtual object (hereinafter, "pinned image"), such that the user is present as a virtual object at the pinned location, but is not physically present at the pinned location. In this manner, the tool provides a social media platform by which direct person-to-person communications and social interactions can be initiated by a user (hereinafter, "initiating user") of the system with another user (hereinafter, "recipient user") of the system, but only if the initiating user is within the physical vicinity of the geographic location of the user location of the recipient user, and/or the pinned location of a pinned image of the recipient user. Conversely, such communications and interactions can only be initiated between the initiating user and a recipient user if the user location of the recipient user and/or a pinned location of the recipient user is within the physical vicinity of the geographic location of the initiating user. Detection of the recipient user or a pinned image of the recipient user can be performed with the camera of the initiating user's mobile device, operating in combination with the location-based augmented reality feature of the app to indicate the physical presence of the recipient user or virtual presence (via a pinned image) of the recipient user. The process of discovering potential recipient users is initiated by the initiating user scanning their surroundings with the camera of their mobile device. If a pinned image is detected with the camera, the location-based augmented reality feature displays the pinned image of the recipient user on the display of the mobile device of the initiating user, with the pinned image being overlaid on the image of the real world captured by the camera. If an individual that appears in the scan of the camera is a user of the tool (i.e., a recipient user), the location-based augmented reality feature displays a suitable notification on the display of the mobile device of the initiating user, for example, a dot or other icon that appears above the head of the recipient user. The initiating user effectively initiates communications and interactions with the recipient user by then using the app to access the user content of the recipient user, for example, by clicking on an icon that the app associates with the recipient user and is shown on the display of the initiating user's mobile device, as nonlimiting examples, the pinned image if the recipient user is virtually present or an icon appearing above the head of the recipient user if the recipient user is physically present. Notably, the initiating user is not required to be acquainted with the receipt user in order to access the recipient user's user content. On the other hand, the tool does not provide any notifications regarding individuals that are not users of the tool, in which case there is no user content to be accessed. Furthermore, the privacy settings of the tool set by users enable any user to choose to be completely undetectable by the tool or choose to partially or completely block access to their user content by individuals or everyone, as may be appropriate under certain social circumstances. Furthermore, the app preferably enables all users to select the distance over which they may (as an initiating user) detect other users and over which other users may detect them (as a recipient user).

FIG. 1 represents a menu that provides a user with access to various features of the app. Such features may be generalized to a variety of users, or may be directed to a predetermined group of users. For example, FIGS. 1 through 14 represent a version of the app that is identified as "TeepeedU" and generally intended to be of interest to users who are members of a university, and therefore may be equipped with certain features that may be particularly relevant to their interests. As nonlimiting examples, the menu in FIG. 1 includes features labeled as "Spot Selfie," "Chill'n Post," "Me," "Carnac," "Flash Antics," and "Rate a Party." The app may be equipped with additional features, for example, a "Safety" feature by which a user can send messages to friends, such as a request for a friend to meet or accompany them, in which case the app enables the other users to track the physical location of the user in response to receiving the message and the user can alert the other users in the case of an emergency. As with apps and touch-screen displays commonly associated with mobile devices, these features preferably appear as icons or buttons (hereinafter, buttons) on the display and a user selects or activates a feature, for example, by pressing, touching or swiping its corresponding button, causing a different image ("screen") to be displayed (opened) on the display of the mobile device.

FIGS. 2 through 14 provide nonlimiting examples of screens displayed by accessing the features of the tool represented in FIG. 1, or otherwise accessing a location-based augmented reality feature of the tool.

FIG. 2 represents the "Me" feature with which a user creates a personal profile as part of the user's user content stored in the memory of their mobile device. The screen displayed in FIG. 2 is indicative of what may be shown on the display of the mobile device of the user that created the personal profile, and represents the type of user content that the user (as a recipient user) may allow other users (initiating users) to access, depending on the privacy settings chosen by the recipient user. In a particular nonlimiting embodiment, the "Me" feature shows the recipient user's username if they are not acquainted with the initiating user, and shows the recipient user's real name if the recipient user has already included the initiating user in their group of friends on the app. From this screen, the initiating user can send a friend request to the recipient user. The recipient user can then accept or refuse the friend request after reviewing the user content of the initiating user.

FIG. 3 represents the "Spot Selfie" feature which allows a user to create a pinned image from an image of themself, which the user can then pin to a geographic location using the location-based augmented reality feature of the tool, thereby creating a pinned location so that the pinned image can be accessed by other users in the physical vicinity of the pinned location. The screen displayed in FIG. 3 is indicative of what may be shown on the display of the mobile device of an initiating user that has used their camera to scan the pinned location, and shows the pinned image overlaid on an image of the real world captured by the camera. The displayed pinned image constitutes what a recipient user may allow other users (initiating users) to see, depending on the privacy settings chosen by the recipient user. As with FIG. 2, the recipient user's real name or username is shown depending on whether they are already friends with the initiating user.

Figure 4:
FIG. 4 represents the display of the mobile device of FIG. 1 showing user content provided by a user of the app that becomes accessible by other users of the app upon viewing the image of FIG. 3 with the location-based augmented reality feature. Viewers can rate the image.

FIG. 4 represents additional information as part of a recipient user's user content that can be accessed by other users (initiating users) after acquiring the pinned image of FIG. 3 on their mobile devices. The screen displayed in FIG. 4 is indicative of the user content of a recipient user that created the pinned image seen in FIG. 3 (and is visible in the upper lefthand corner of FIG. 4), and that the recipient user may allow other users (initiating users) to see, depending on the privacy settings chosen by the recipient user. Optionally, initiating users are able to rate and/or comment on the pinned image. As with FIGS. 2 and 3, the recipient user's real name or username is shown depending on whether they are already friends with the initiating user, and may accept or refuse a friend request of the initiating user after reviewing the user content of the initiating user.

FIG. 5 represents the "Chill'n Post" feature which allows a user to create a pinned image from an image of a past or present social gathering, which the user can then pin to a geographic location using the location-based augmented reality feature of the tool, thereby creating a pinned location so that the pinned image can be accessed by other users in the physical vicinity of the pinned location. The screen displayed in FIG. 5 is indicative of what may be shown on the display of the mobile device of an initiating user that has used their camera to scan the pinned location, and shows the pinned image overlaid on an image of the real world captured by the camera. The displayed pinned image constitutes what a recipient user may allow other users (initiating users) to see, depending on the privacy settings chosen by the recipient user. As with FIGS. 2 through 4, the recipient user's real name or username is shown depending on whether they are already friends with the initiating user, and may accept or refuse a friend request of the initiating user after reviewing the user content of the initiating user.

FIG. 6 represents additional information as part of a recipient user's user content that can be accessed by other users (initiating users) after acquiring the pinned image of FIG. 5 on their mobile devices. The screen displayed in FIG. 6 is indicative of the user content of a recipient user that created the pinned image of FIG. 5 (and also visible in FIG. 6), and that the recipient user may allow other users (initiating users) to see, depending on the privacy settings chosen by the recipient user. Optionally, initiating users are able to rate and/or comment on the pinned image. As before, the recipient user's real name or username is shown depending on whether they are already friends with the initiating user, and may accept or refuse a friend request of the initiating user after reviewing the user content of the initiating user.

Figure 7:
FIG. 7 represents the display of the mobile device of FIG. 1 showing an image captured by a camera of the mobile device, in which users of the app are identified with the location-based augmented reality feature in accordance with a nonlimiting embodiment of the invention.

The "Carnac" feature is similar to the "Spot Selfie" and "Chill'n Post" features, except that by scanning a geographic area with the camera of their mobile device, an initiating user is able to detect the actual physical presence of other users of the app. As previously noted, the location-based augmented reality feature of the app indicates the presence of other users of the app on the display of the initiating user's mobile device, for example, as a result of the location-based augmented reality feature displaying a notification, such as profile pictures of the other users as shown in FIG. 7, though other means of notification are also within the scope of the invention. Whether a notification of a particular recipient user appears on the display of an initiating user will depend on the privacy settings chosen by that recipient user. Thereafter, the initiating user can use their mobile device to access the recipient user's user content, for example, by tapping on the profile picture of the user(s) of interest to the initiating user.

The pinned images and user content displayed and represented in FIGS. 2 through 7 may be stored locally in the memory of the recipient user's mobile device, stored remotely on a server of the mobile network, or a combination of both.

As evident from the above, the above features of the tool allow initiating users to access the user content of recipient users with the location-based augmented reality feature of the tool. In FIG. 3, an image of a user is superimposed over a physical, real world environment as viewed through an imaging device (for example, a camera) on another user's cellular (smart) phone (or other handheld electronic mobile device). Similarly, in FIG. 5 an image of a group of individuals is superimposed over a physical location near where the image was originally generated, as viewed by another user at a later time. In each case, the user has pinned the images to their respective geographic locations, which are stored and identifiable on the basis of their unique geographic (e.g., GPS) coordinates as detected by the location device (e.g., GPS receiver) of the user's mobile device. Preferably, a user may access information about a second user by viewing the second user through a display of the first user's mobile device. If the second user has a mobile device running the app, the first user may be provided access to the second user's information as a result of the augmented reality feature displaying a pinned image of the second user on the first user's mobile device.

Since various features of the app (for example, the Spot Selfie and Chill'n Post features) provide for pinning an image or other user content (collectively, "pinned user content") accessible by other users in a geographic location, the app provides means for users (initiating users) to locate pinned user content of other users (recipient users). For example, the app may include means for identifying on a map the specific geographic location of all available user content that has been pinned and/or specific filtered user content. As a nonlimiting but more specific example, the app may provide a search (radar) feature that presents a map to an initiating user with locations of pinned user content of potential recipient users highlighted on the map, for example, using the GPS coordinates of the pinned user content, relative to the location of the initiating user (for example, over an area encompassing a predetermined distance around the initiating user, as set by the initiating user). The search feature may include filter options to limit the highlighted user content, for example, based on distance or category/type of user content. For example, the app may include filter options including "hanging out" which includes only pinned user content that is relatively near the physical location of the initiating user, "walking around" which includes a larger geographic area than "hanging out," and "stadium" which includes all available pinned user content regardless of location.

Referring again to FIG. 2, a recipient user's information displayed on an initiating user's mobile device may include a visual display (labeled as "Me") that is representative of the recipient user's personality, preferences, or other information. Preferably, the visual display includes what is identified in FIG. 2 as a "My C-Code," comprising a grid of various colors with each color representing a trait, preference, intention, etc. of the recipient user. As such, the colors of the visual display may be unique to the individual recipient user. As a nonlimiting example, the visual display may be generated as a result of the recipient user having previously answered a series of questions, such that each color in the grid corresponds to one of the questions, and the shade of each color indicates the answer given by the recipient user to the corresponding question. Preferably, the visual display is accessible by other users (initiating users) in order to provide a quick summary of the recipient user's traits, preferences, intentions, etc. Additional nonlimiting information regarding steps taken by a user to create their My C-Code is provided in FIGS. 8 through 14.

Finally, the app may provide additional features such as the aforementioned "Safety," "Flash Antics," and "Rate a Party" features. As an example, the Flash Antics feature may provide means by which a plurality of users in a vicinity of a geographic location are able to vote on an activity to be performed by the users at the geographic location, and the Rate a Party feature may provide means for labeling a geographic location where a social gathering is currently occurring, and rate the social gathering for viewing by other users.

In view of the above, the app provides various functions for selectively providing an initiating user with social media-related information about other users with whom they may or may not be acquainted and who are in their physical vicinity in order to promote direct person-to-person communications and social interactions. For example, in the case of two users that are within a sufficiently small geographic area that enables a first of the users to see the other, the first user may decide they would like to know more about the second user. The first user may then, in the role of the initiating user, use the app in an attempt to access information about the other user, who is now in the role of a recipient user. Because the other person is also a user with user content that includes a personal profile that they created in the app, the initiating user may be provided with information about the recipient user contained in the personal profile of the recipient user. The information available to the initiating user can be limited or even prevented by the recipient user's privacy settings. For example, as represented in FIG. 2, the initiating user may be provided access to information such as the recipient user's name, picture, interests, hobbies, etc., as part of their personal profile. As shown in FIG. 2, the initiating user is provided with the recipient user's My C-Code, and by interpreting the colors within the My C-Code, will be informed of the recipient user's general personality, interests, etc. Such information is intended to inform users of whether other users within their vicinity share common interests, and to otherwise promote direct person-to-person communications and social interactions. The app can also enable an initiating user to search other users (for example, those displayed with the Carnac feature) based on a percentage match to the initiating user's My C Code as calculated by the app. Such a capability can generate a list of users that can then be reviewed by the initiating user, who can then send a friend request to those users with whom the initiating user wishes to become friends.

In addition to promoting direct person-to-person communications and social interactions between unacquainted individuals, the personal information and location of the users provides a mutually beneficial marketing opportunity. In particular, the app preferably is capable of identifying businesses, products, events, etc., that may be relevant to an individual user based on the user's personality, interests, activities, etc., as indicated by the contents of their personal profile Based on this information, the app may then provide advertisements to the user based on the user's preferences and the user's actual (GPS) location. The advertisements are effectively customized customer electronic billboards, which the app may show as virtual objects floating in the augmented reality space displayed by the camera of the user's mobile device. The user can then tap the billboard to obtain more information about the advertised product. In addition, the app may provide feedback regarding the user's response to the advertisements.

While the invention has been described in terms of specific or particular embodiments, it is apparent that other forms could be adopted by one skilled in the art. For example, the tool and its features could differ in appearance and construction from the embodiments described herein and shown in the drawings, and the tool may operate on devices other than those described herein. Accordingly, it should be understood that the invention is not limited to any embodiment described herein or illustrated in the drawings.

It should also be understood that the phraseology and terminology employed above are for the purpose of describing the disclosed embodiments, and do not necessarily serve as limitations to the scope of the invention. Therefore, the scope of the invention is to be limited only by the following claims.

What is claimed is:

1. A method for the interaction of a user of a social media environment via a mobile device, the method comprising:
presenting a plurality of profile questions to each of a plurality of the users of a social media environment via a corresponding mobile device, each of the plurality of profile questions having a set of profile question answers;
receiving from each of the plurality of the users via a corresponding mobile device a selection of an answer from the corresponding set of question profile answers for each of one or more of the plurality of profile questions; each of the plurality of profile questions having associated therewith a question color, each of the profile question answers for the corresponding profile question having associated therewith a different shade of the corresponding question color;
for each of the plurality of users, creating in the social media environment a multicolor profile displayable graphic based on the corresponding user's profile question answers, the multicolor profile displayable graphic including a plurality of answer display regions, each of the plurality of answer display regions corresponding to a question of the plurality of profile questions, wherein the shade of question color that corresponds to the selected profile question answer by the corresponding user is included in the answer display region of the plurality of answer display regions that corresponds to the question of the plurality of profile questions that corresponds to the selected profile question answer, wherein the multicolor profile displayable graphic and the profile question answers for each of the plurality of users are part of the social media profile of the corresponding user; and
displaying a first multicolor profile displayable graphic corresponding to a first user of the plurality of users to the first user via a first mobile device of the first user.

2. A method according to claim 1, wherein the first multicolor profile displayable graphic is a grid shaped graphic and each of the answer display regions is a region within a grid pattern.

3. A method according to claim 1, further comprising displaying to the first user an augmented reality user interface of the social media environment, the augmented reality user interface being displayable via the first mobile device and including a display of a real world display of a geographic area proximate the first mobile device, the information for the display of the real world display obtained via a camera element of the first mobile device.

4. A method according to claim 3, wherein the augmented reality user interface includes a display of a first displayable object representing a user profile of a second user of the plurality of users, the availability of the first displayable object based on a matching of the first user to the second user via the social media environment.

5. A method according to claim 4, wherein the matching of the first user to the second user includes a percentage match of (a) the first multicolor profile displayable graphic to a second multicolor profile displayable graphic of the second user or (b) the selected profile question answers of the first user to the selected profile question answers of the second user.

6. A method according to claim 5, further comprising allowing the first user to access the second multicolor profile displayable graphic.

7. A method according to claim 4, further comprising allowing the first user to access a second multicolor profile displayable graphic corresponding to the second user.

8. A method according to claim 4, wherein the second user sets within the social media environment a privacy setting for limiting the accessibility of content of the second user to other users of the social media environment, the content of the second user including a second multicolor profile displayable graphic corresponding to the second user.

9. A method according to claim 8, further comprising allowing the first user to access the second multicolor profile displayable graphic.

10. A method according to claim 8, wherein the matching is based on a search by the first user.

11. A method according to claim 10, further comprising displaying to the first user a list of users of the plurality of users based on the matching of the first user to the second user.

12. A method according to claim 4, further comprising displaying to the first user a list of users of the plurality of users based on the matching of the first user to the second user.

13. A method according to claim 4, wherein the augmented reality user interface includes a display of a second displayable object representing a content item of the second user, the availability of the second displayable object to the first user being based on the matching of the first user to the second user.

14. A method according to claim 1, further comprising matching the first user to a second user of the plurality of users based on a percentage match of (a) the first multicolor profile displayable graphic of the first user to a second multicolor profile displayable graphic of the second user or (b) the selected profile question answers of the first user to the selected profile question answers of the second user.

15. A method according to claim 14, wherein the matching of the first user to the second user is based on a search by the first user.

16. A method according to claim 14, further comprising allowing the first user to access the second multicolor profile displayable graphic.

17. A method according to claim 14, further comprising allowing the first user to access a non-personal profile item of content of the second user based on the matching of the first user to the second user.

18. A method according to claim 1, further comprising:
identifying in the social media environment a marketing opportunity that is relevant to the first user based on information in the social media profile corresponding to the first user; and
providing the marketing opportunity to the first user via the social media environment.

19. A method for the interaction of a user of a social media environment via a mobile device, the method comprising:
presenting a plurality of profile questions to each of a plurality of the users of a social media environment via a corresponding mobile device, each of the plurality of profile questions having a set of profile question answers;
receiving from each of the plurality of the users via a corresponding mobile device a selection of an answer from the corresponding set of question profile answers for each of one or more of the plurality of profile questions; each of the plurality of profile questions having associated therewith a question color, each of the profile question answers for the corresponding profile question having associated therewith a different shade of the corresponding question color;

for each of the plurality of users, creating in the social media environment a multicolor profile displayable graphic based on the corresponding user's profile question answers, the multicolor profile displayable graphic including a plurality of answer display regions, each of the plurality of answer display regions corresponding to a question of the plurality of profile questions, wherein the shade of question color that corresponds to the selected profile question answer by the corresponding user is included in the answer display region of the plurality of answer display regions that corresponds to the question of the plurality of profile questions that corresponds to the selected profile question answer, wherein the multicolor profile displayable graphic and the profile question answers for each of the plurality of users are part of the social media profile of the corresponding user;

displaying a first multicolor profile displayable graphic corresponding to a first user of the plurality of users to the first user via a first mobile device of the first user, wherein the first multicolor profile displayable graphic is a grid shaped graphic and each of the answer display regions is a region within a grid pattern;

matching the first user to a second user of the plurality of users based on a percentage match of (a) the first multicolor profile displayable graphic of the first user to a second multicolor profile displayable graphic of the second user or (b) the selected profile question answers of the first user to the selected profile question answers of the second user;

allowing the first user to access the second multicolor profile displayable graphic based on said matching; and allowing the first user to access a non-personal profile item of content of the second user based on said matching.

20. A processor-readable volatile memory including processor-executable instructions for performing a method of interacting in a social media environment, the instructions comprising:

a set of instructions for presenting a plurality of profile questions to each of a plurality of the users of a social media environment via a corresponding mobile device, each of the plurality of profile questions having a set of profile question answers;

a set of instructions for receiving from each of the plurality of the users via a corresponding mobile device a selection of an answer from the corresponding set of question profile answers for each of one or more of the plurality of profile questions;

each of the plurality of profile questions having associated therewith a question color, each of the profile question answers for the corresponding profile question having associated therewith a different shade of the corresponding question color;

a set of instructions for, creating in the social media environment, for each of the plurality of users, a multicolor profile displayable graphic based on the corresponding user's profile question answers, the multicolor profile displayable graphic including a plurality of answer display regions, each of the plurality of answer display regions corresponding to a question of the plurality of profile questions, wherein the shade of question color that corresponds to the selected profile question answer by the corresponding user is included in the answer display region of the plurality of answer display regions that corresponds to the question of the plurality of profile questions that corresponds to the selected profile question answer, wherein the multicolor profile displayable graphic and the profile question answers for each of the plurality of users are part of the social media profile of the corresponding user; and a set of instructions for displaying a first multicolor profile displayable graphic corresponding to a first user of the plurality of users to the first user via a first mobile device of the first user.

21. A method according to claim 19, further comprising displaying to the first user an augmented reality user interface of the social media environment, the augmented reality user interface being displayable via the first mobile device and including a display of a real world display of a geographic area proximate the first mobile device, the information for the display of the real world display obtained via a camera element of the first mobile device.

22. A method according to claim 21, wherein the augmented reality user interface includes a display of a first displayable object representing a user profile of a second user of the plurality of users, the availability of the first displayable object based on a matching of the first user to the second user via the social media environment.

23. A method according to claim 22, wherein the second user sets within the social media environment a privacy setting for limiting the accessibility of content of the second user to other users of the social media environment, the content of the second user including a second multicolor profile displayable graphic corresponding to the second user.

24. A method according to claim 23, wherein the matching is based on a search by the first user.

25. A method according to claim 24, further comprising displaying to the first user a list of users of the plurality of users based on the matching of the first user to the second user.

26. A method according to claim 22, further comprising displaying to the first user a list of users of the plurality of users based on the matching of the first user to the second user.

27. A method according to claim 22, further comprising allowing the first user to access a non-personal profile item of content of the second user based on the matching of the first user to the second user.

28. A method according to claim 19, wherein the matching of the first user to the second user is based on a search by the first user.

29. A method according to claim 19, further comprising:
identifying in the social media environment a marketing opportunity that is relevant to the first user based on information in the social media profile corresponding to the first user; and
providing the marketing opportunity to the first user via the social media environment.

30. A processor-readable nonvolatile memory according to claim 20, wherein the first multicolor profile displayable graphic is a grid shaped graphic and each of the answer display regions is a region within a grid pattern.

31. A processor-readable nonvolatile memory according to claim 20, further comprising displaying to the first user an augmented reality user interface of the social media environment, the augmented reality user interface being displayable via the first mobile device and including a display of a real world display of a geographic area proximate the first mobile device, the information for the display of the real world display obtained via a camera element of the first mobile device.

32. A processor-readable nonvolatile memory according to claim 31, wherein the augmented reality user interface includes a display of a first displayable object representing a user profile of a second user of the plurality of users, the availability of the first displayable object based on a matching of the first user to the second user via the social media environment.

33. A processor-readable nonvolatile memory according to claim 32, wherein the matching of the first user to the second user includes a percentage match of (a) the first multicolor profile displayable graphic to a second multicolor profile displayable graphic of the second user or (b) the selected profile question answers of the first user to the selected profile question answers of the second user.

34. A processor-readable nonvolatile memory according to claim 33, further comprising allowing the first user to access the second multicolor profile displayable graphic.

35. A processor-readable nonvolatile memory according to claim 32, further comprising allowing the first user to access a second multicolor profile displayable graphic corresponding to the second user.

36. A processor-readable nonvolatile memory according to claim 32, wherein the second user sets within the social media environment a privacy setting for limiting the accessibility of content of the second user to other users of the social media environment, the content of the second user including a second multicolor profile displayable graphic corresponding to the second user.

37. A processor-readable nonvolatile memory according to claim 36, further comprising allowing the first user to access the second multicolor profile displayable graphic.

38. A processor-readable nonvolatile memory according to claim 36, wherein the matching is based on a search by the first user.

39. A processor-readable nonvolatile memory according to claim 38, further comprising displaying to the first user a list of users of the plurality of users based on the matching of the first user to the second user.

40. A processor-readable nonvolatile memory according to claim 32, further comprising displaying to the first user a list of users of the plurality of users based on the matching of the first user to the second user.

41. A processor-readable nonvolatile memory according to claim 32, wherein the augmented reality user interface includes a display of a second displayable object representing a content item of the second user, the availability of the second displayable object to the first user being based on the matching of the first user to the second user.

42. A processor-readable nonvolatile memory according to claim 20, further comprising matching the first user to a second user of the plurality of users based on a percentage match of (a) the first multicolor profile displayable graphic of the first user to a second multicolor profile displayable graphic of the second user or (b) the selected profile question answers of the first user to the selected profile question answers of the second user.

43. A processor-readable nonvolatile memory according to claim 42, wherein the matching of the first user to the second user is based on a search by the first user.

44. A processor-readable nonvolatile memory according to claim 42, further comprising allowing the first user to access the second multicolor profile displayable graphic.

45. A processor-readable nonvolatile memory according to claim 42, further comprising allowing the first user to access a non-personal profile item of content of the second user based on the matching of the first user to the second user.

46. A processor-readable nonvolatile memory according to claim 20, further comprising:
identifying in the social media environment a marketing opportunity that is relevant to the first user based on information in the social media profile corresponding to the first user; and
providing the marketing opportunity to the first user via the social media environment.

\* \* \* \* \*